United States Patent
Beveridge et al.

(10) Patent No.: US 11,797,672 B1
(45) Date of Patent: Oct. 24, 2023

(54) MACHINE LEARNING-BASED TECHNIQUE FOR MODEL PROVENANCE

(71) Applicant: HiddenLayer, Inc., Austin, TX (US)

(72) Inventors: David Beveridge, Tillamook, OR (US); Andrew Davis, Portland, OR (US)

(73) Assignee: HiddenLayer, Inc., Austin, TX (US)

( * ) Notice: Subject to any disclaimer, the term of this patent is extended or adjusted under 35 U.S.C. 154(b) by 0 days.

(21) Appl. No.: 18/327,772

(22) Filed: Jun. 1, 2023

(51) Int. Cl.
 *G06F 21/55* (2013.01)
 *G06N 20/00* (2019.01)

(52) U.S. Cl.
 CPC .......... *G06F 21/554* (2013.01); *G06N 20/00* (2019.01); *G06F 2221/034* (2013.01)

(58) Field of Classification Search
 CPC ............................... G06F 21/554; G06F 20/00
 See application file for complete search history.

(56) References Cited

U.S. PATENT DOCUMENTS

| | | | | |
|---|---|---|---|---|
| 11,347,845 | B2 * | 5/2022 | Kursun | G06F 21/554 |
| 11,361,100 | B1 * | 6/2022 | Gates | G06N 5/043 |
| 11,501,108 | B2 * | 11/2022 | Michiels | G06F 11/10 |
| 11,514,365 | B2 * | 11/2022 | Cheruvu | H04L 9/0643 |
| 11,704,677 | B2 * | 7/2023 | Savir | G06V 10/82 |
| | | | | 705/304 |
| 2021/0019605 | A1 * | 1/2021 | Rouhani | G06Q 20/1235 |
| 2021/0157912 | A1 * | 5/2021 | Kruthiveti Subrahmanyeswara Sai | |
| | | | | G06N 20/00 |
| 2022/0156368 | A1 * | 5/2022 | Spyridopoulos | G06N 3/08 |
| 2022/0398311 | A1 * | 12/2022 | Young | G06N 20/00 |
| 2023/0185906 | A1 * | 6/2023 | Paranjape | G06N 20/20 |
| | | | | 726/22 |
| 2023/0185912 | A1 * | 6/2023 | Sinn | G06F 21/56 |
| | | | | 726/23 |
| 2023/0222385 | A1 * | 7/2023 | Shimizu | G06N 20/00 |
| | | | | 706/12 |

* cited by examiner

*Primary Examiner* — Viral S Lakhia
(74) *Attorney, Agent, or Firm* — Jones Day

(57) ABSTRACT

Data is received that characterizes artefacts associated with each of a plurality of layers of a first machine learning model. Fingerprints are generated corresponding to each of the artefacts in each layer. The generated fingerprints can collectively form a model indicator for the first machine learning model. A second machine learning model then determines, based on the generated fingerprints, whether the first machine learning model is derived from another machine learning model. Data provided this characterization can be provided to a consuming application or process. This second machine learning model can be trained model with historical fingerprints having a known provenance classification. Related apparatus, systems, techniques and articles are also described.

20 Claims, 5 Drawing Sheets

MACHINE LEARNING-BASED TECHNIQUE FOR MODEL PROVENANCE

TECHNICAL FIELD

The subject matter described herein relates to techniques for fingerprinting aspects of a machine learning model for model provenance and other applications.

BACKGROUND

Machine learning models comprise complex hierarchies of artefacts which define how such models operate given a certain data input. Machine learning models can sometimes be modified or duplicated for malicious or other purposes. Such actions are difficult to identify given the large number of artefacts that typically form part of a machine learning model.

SUMMARY

In a first aspect, data is received that characterizes artefacts associated with each of a plurality of layers of a first machine learning model. Fingerprints are then generated for each of the artefacts in the layers of the first machine learning model. These generated fingerprints collectively form a model indicator for the first machine learning model. It is then determined whether the first machine learning model is derived from another machine learning model by performing a similarity analysis between the model indicator for the first machine learning model and model indicators generated for each of a plurality of reference machine learning models each comprising a respective set of fingerprints. Data characterizing the determination can be provided to a consuming application or process.

The artefacts can include one or more of weights, biases, running mean, and running variance. There can, in some instances, be only a single fingerprint for an artefact while in other instances there are multiple fingerprints for an artefact.

The similarity analysis can be conducted on an fingerprint-by-fingerprint basis and/or on a model indicator-by-model indicator basis.

Each fingerprint can comprise a matrix of values which is used for the similarity analysis. In one variation, similarity is determined by calculating a Euclidean distance from each fingerprint of the first machine learning model relative to each fingerprint of the reference machine learning models. In another variation, similarity is determined by calculating a number of values in each fingerprint of the first machine learning model within each of a plurality of pre-defined bins such that for each reference machine learning model, a number of values in each fingerprint of the reference machine learning model within each of a plurality of pre-defined bins are calculated (to generate a value distribution). The similarity analysis can compare value distributions in the first machine learning model with value distributions for each of the reference machine learning models.

In some variations, the similarity analysis can include inputting a reference set of inputs into the first machine learning model to generate an output set and comparing the output set to outputs for each of a plurality of reference output sets each corresponding to a different one of the reference machine learning models. In some cases, multiple different similarity analyses can be performed (e.g., in parallel or in sequence) in order to identify provenance of the analyzed model.

The provision of data can include one or more of: storing the data characterizing the determining in physical persistence, loading the data characterizing the determining into memory, transmitting the data characterizing the determining over a network to a remote computing device, or causing the data characterizing the determining to be displayed in a graphical user interface.

The derivation determination can be based on a level of similarity between the first machine learning model and one of the reference machine learning models. In some cases, a score is generated which characterizes the level of similarity and which can form part of the provided data.

In some instance, the consuming application or process can initiate a remediation operation relative to the first model (based on the similarity analysis, etc.). The remediation operation can include, for example, one or more of: isolating or blocking access to the first machine learning model, partially disabling functionality of the first machine learning model, logging inputs and/or outputs of the first machine learning model, or poisoning the first machine learning model.

In an interrelated aspect, data is received that characterizes artefacts associated with each of a plurality of layers of a first machine learning model. Fingerprints are generated corresponding to each of the artefacts in each layer. The generated fingerprints can collectively form a model indicator for the first machine learning model. A second machine learning model then determines, based on the generated fingerprints, whether the first machine learning model is derived from another machine learning model. Data provided this characterization can be provided to a consuming application or process. This second machine learning model can be trained model with historical fingerprints having a known provenance classification.

In another interrelated aspect, data is received that characterizes artefacts associated with each of a plurality of layers of a first machine learning model. Thereafter, fingerprints are generated for each of the artefacts in such layer. These generated fingerprints and/or a corresponding model indicator can be provided to a consuming application or process.

The fingerprints can be generated using various techniques either individually or in concert. For example, the fingerprints can be generated by determining a means distance of a manifold representing an artefact from a point in space and/or by measuring fluctuations of a manifold representing an artefact relative to a mean distance. Further, the fingerprints can be generated by measuring frequency of values in an artefact relative to expected quantized values.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for generating fingerprints characterizing attributes of machine learning models which, in turn, can be used to determine a provenance of a particular machine learning model. This provenance can be used for various purposes including taking remediation actions such as disabling and/or isolating the machine learning model and/or its output. Further, the comparison techniques are more computationally efficient and require less storage due, in part, to the artefact characterization and comparison techniques provided herein.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to determining a provenance of a machine learning model which is useful for numerous purposes. In particular, fingerprints are generated which characterize artefacts forming parts of the machine learning model which, in turn, can be compared against a database of previously generated fingerprints (which are associated with other machine learning models). Such provenance information can be used, for example, to identify unauthorized use of machine learning models which, in turn, can be used for malicious purposes (e.g., intentionally provide a false classification or other output), for identifying license violations or IP theft, and the like. Remedial action can be taken if the machine learning model is unauthorized including taking the model offline, isolating the model, blocking access to the model, monitoring behavior of the model (e.g. logging inputs and outputs to the models), modifying the output as a countermeasure, and/or other remedial measures such as model poisoning. Model poisoning, in this context, can include various actions which cause the model to consistently provide incorrect results. For example, the output of the model (before being delivered to a consuming application or process) can be modified using a deterministic signals which subtly alter the model's return-value (i.e., score, etc.) such that a system learning from the model would receive incorrect, though plausible data, thus poisoning such system's training data.

Figure 1:
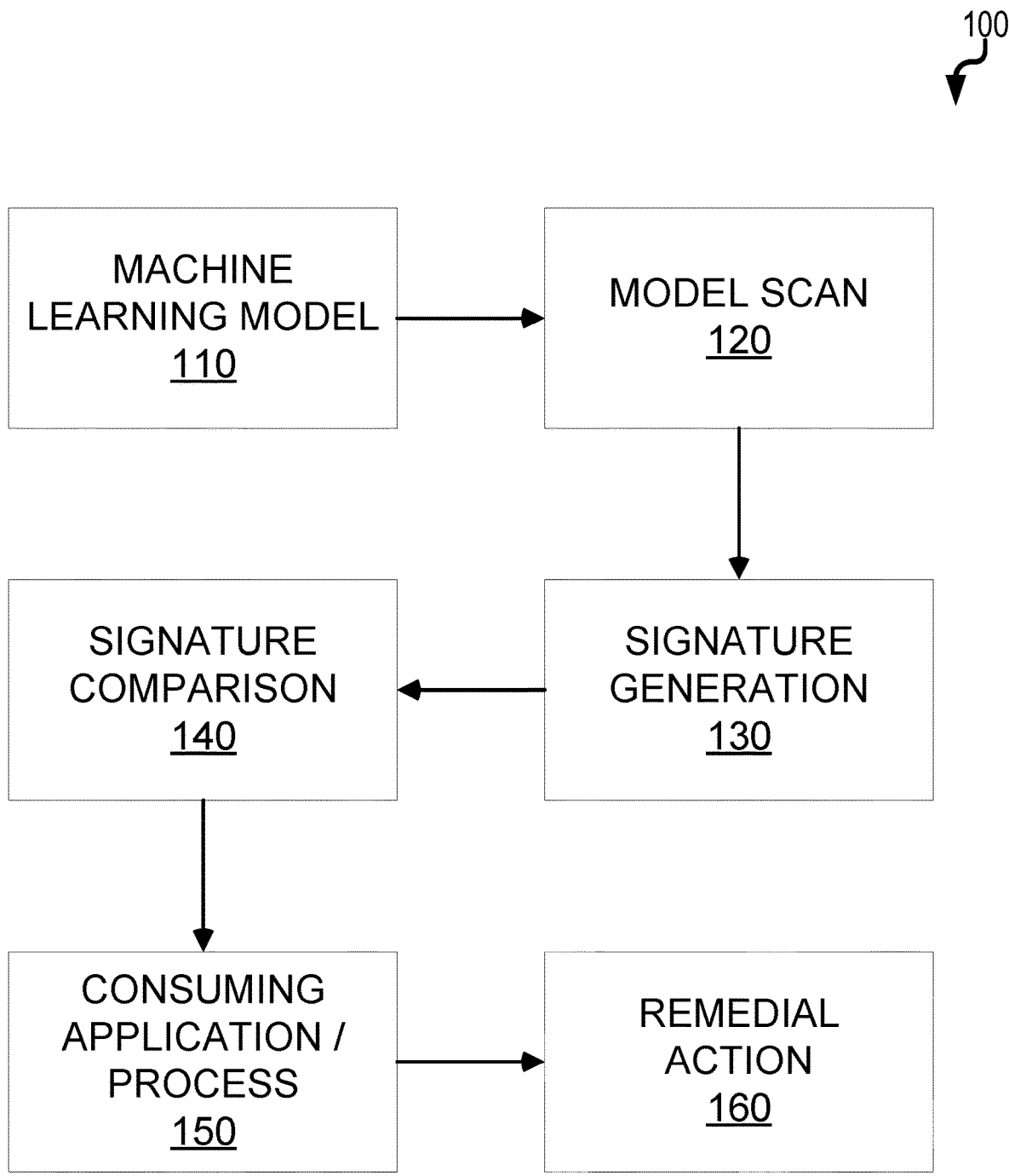
FIG. 1 is a diagram illustrating a first machine learning model fingerprint generation and comparison workflow.

With reference to diagram 1 of FIG. 1, a machine learning model 110 can be scanned 120 to identify and characterize each of a plurality of artefacts forming part of the machine learning model 110. Scanning can take various forms including first analyzing an item (e.g., data structure/program/artefact, etc.) to determine whether it is some sort of a machine learning model. If so, the a type of model can be determined an the item can be parsed according to such type. The parsing can result in a collection of artefacts and, optionally, metadata corresponding to each of the mathematical artefacts (e.g., layers of weights, biases, etc.). Various fingerprint-taking measures can be undertaken upon each artefact to generate a fingerprint (sometimes referred to as a signature) and the fingerprint or an abstraction therefor can be stored in a datastore. This data store can maintain the heritage of the fingerprint to model relationship and allow for the comparison of fingerprints of one model to another. In this terminology, fingerprints should denote that any similar value between fingerprints of the same time imply similarity of the source data that produced said values. The more fingerprints that match between a pair of artefacts, the more likely it is that the artefacts are derived/cloned one from the other; the more artefacts that match in this manner, the more likely that the same can be said about the layer and, thus, the model itself. The artefacts can be individually characterized and on a layer-by-layer basis. The artefacts can comprise values which affect the operation of the machine learning model (i.e., the classification/output, etc.). Example artefacts include one or more of weights, biases, running mean, and running variance.

The scanning operation 120 ultimately generates data which characterizes the artefacts associated with each of the layers of the machine learning model. This data is used, at 130, to generate fingerprints for each layer which corresponds to the artefacts in associated layer of the machine learning model. The generated fingerprints for a particular machine learning model can be referred to as a model indicator. The model indicator can take the form of a matrix of values or a plurality of matrices.

The fingerprints can be generated using various techniques provided that they are (1) deterministic and (2) similar input produces similar output such that similar data results in fingerprints that are, mathematically speaking, "near" each other, and (3) a change in the quantity of data, when similar, does not significantly affect the output (i.e., normalized).

As one example, a fingerprint can be generated based on a mean distance of the manifold from a point. With this technique, each entry in an artefact can be treated as a distance such that one can measure the average distance of those against a point in space. The resulting number is (a) inherently normalized, (b) immune to reordering of data, and (c) resilient against being altered significantly through small alterations in the input data. In some variations, the resiliency can be further strengthened by the addition of clipping or removing outlying data points.

Another technique for fingerprint can be based on a fluctuation of the manifold from its own mean distance. Such an arrangement can measure the smoothness of the manifold—by measuring the distance on average that points on its surface from its own average. The resulting number is (a) inherently normalized, (b) immune to reordering of data, (c) resilient against being altered significantly through small alterations in the input data, and (d) resistant to the scaling of the entire manifold. In some variations, the resiliency can be further strengthened by the addition of clipping or removing outlying data points In some variations, the two fingerprinting techniques above can be cross referenced in that having an approximate match between two artefacts for both mean distance and fluctuation indicates an especially strong match.

In a different variation, a fingerprint can be generated by measuring the expected frequency of real versus expected quantized values. Given an input of an artefact to match against others, one can tally the number of data points that fall into various regions of space and consider that a set of expected values. This process can then be repeated for other artefacts and considered experimental values. A statistical test, such as a Chi-Square, can be performed to compare these two sets and (after being normalized) similar resulting values would be indication of similar nature of input data (i.e., a "match"). Note that the size and quantity of spatial regions in this technique will have a strong effect on this technique. The resulting number is (a) inherently normalized, (b) immune to reordering of data, (c) highly resilient against being altered significantly through small alterations in the input data, and (d) highly resistant to the scaling of the entire manifold. Points (c) and (d) can be further strengthened by the addition of clipping or removing outlying data points.

Pseudocode for one variation of fingerprint generation, at 130, is provided below.

```
// Create fingerprints as needed
for each $model in models:
    for each $layer in $model:
        for each $artefact in $layer:
            for each $fingerprinttype in fingerprinting_algorithms:
                compute $fingerprint from $fingerprintingtype of $artefact
                save to database: model-name +
                artefact-name :: $fingerprinttype:
$fingerprint
```

//There are now a set of fingerprints for each artefact in each layer of each model that we can use to search for similarities The model indicator generated for the machine learning model can be compared, at 140, against a library (i.e., a plurality) of model indicators generated for other known (i.e., pre-characterized) machine learning models (performed in a similar manner as that described above). This comparison can be performed, for example, at different granularities. For example, the comparison can be at the model indicator level, the layer level (i.e., all fingerprints for a particular layer), or on the individual fingerprint level (which corresponds to a single artefact). When comparing signatures/model indicators, a tolerance in comparison can be derived, which gives meaning to the concept of "near" when using that fingerprint—whether being w/in 10% or 1% or 0.1% or any other specified value denotes that the inputs are considered to be similar. Fingerprints should be compared only to other fingerprints of the same variety. For example, a fingerprint generated using a Hamming Distance should only be compared to other Hamming Distance fingerprints. Similarly, a Shannon entropy should only be compared to other Shannon Entropy fingerprints, and the like. It is of import to note that multiple fingerprints can match between two artefacts and, indeed, such a compounded match indicates ever more likely origin-data commonality between the models being compared. Conversely, not all fingerprints need to match.

The comparison, at 140, can be performed using a similarity analysis. The similarity analysis can be performed, for example, across raw float-values of each value in the matrix of each artefact; with no consideration to ordering.

In one illustration, a simplified artefact can be characterized in 3×4 matrix form can be as follows:

| −1.00 | 0.00 | 1.00 |
|---|---|---|
| 0.50 | 0.60 | 0.70 |
| 0.10 | 0.05 | −0.20 |
| 0.25 | 0.15 | 0.15 |

Such a matrix can be treated as a 12-number sequence and one or more similarity algorithms can be run with such sequence as input. In most cases, the artefacts have significantly more values such as hundreds or even thousands of columns (depending in part on the complexity of the underlying machine learning model).

One similarity algorithm can determine Euclidean distance from a specific point. Using 0 in this example would result in $$\frac{\sqrt{\sum o_i^2}}{n};$$

where o (observation) is each value seen as i iterates across the 9 values and n is the total number of values (9): ~0.150462.

Another similarity algorithm $$\frac{\sqrt{\sum (o_i - d)^2}}{n}$$

can use Euclidean distance (noted as d, inf.) and measure the distance from that overall value (repeating the previous similarity algorithm, but using 0.35027 . . . as the point to measure from)—resulting in ~0.121258 . . . .

A third similarity algorithm can separate values into a number of bins of arbitrary size; tally the number of entries in such bins, then use that as a set of expected values to find whilst tallying (in the same way) other artefacts and comparing the results. With such an arrangement, the tallied results can be stored for subsequent models being analyzed.

Of note is that these values tend to not be altered by small changes in the input values (e.g., adding a 13th entry of 0.33) would change these similarity algorithm results to 0.141189 . . . and 0.114294 . . . , respectively. The input data was 92.3% identical; the output fingerprints were 94% similar. Such an arrangement is advantageous in that (1) there is an abstract value that is both deterministic and proportional to the input value; (2) this abstract value is simple enough to be used in fast, mass-scale comparisons; (3) the abstract value is not disproportionately affected by a small change in the input value (unlike a hash, CRC, or fuzzy hash, etc.); (4) the abstract values are small enough to store for all artefacts without having to store the entirety of data forming the machine learning model; and (5) the abstract values are unaffected entirely by non-affecting changes of re-ordering/inversion (which have no effect on the model but make it look entirely different to a cryptographic hash, etc.).

Pseudocode for executing a similarity analysis, at 140, can be as provided below:

```
//Comparison (aka hunting):
//"target" model means the one containing artefacts being
    sought in "other" models
```

//i.e., "I am looking for target model's assets in these other models" for each $artefact_fingerprint that is in the db for target model:
for each "other" model in the DB:
get all fingerprints for all artefacts (optionally narrow by matching type (weights to weights only, etc.) matches are anything where the values of target_fingerprint are close to other_fingerprint
output all matches organized by the layers that contain them
If one sees that an artefact in a layer matched in 1+ ways: closer related the more ways match layer-to-layer
If one sees multiple layers match in the above described way: closer related the more layers match Another similarity algorithm can consider differences between two sets of model outputs given a reference input set. If the sets of model outputs between two models are sufficiently similar (either by one of the similarity algorithms listed above, or by a hashing algorithm), it can be determined the model fingerprints to be of similar model families. Stated differently, a reference set of inputs can be inputted into both model A and model B and a similarity analysis can be compared against the input. The set of inputs, for example, can comprises a plurality of vectors (e.g., 10+, 100+, 1000+, etc.) which are input separately and which each generate a respective output.

The ultimate output can be used, at 160, by a consuming application or process. The consuming application or process can characterize the provenance of the machine learning model by, for example, identifying or otherwise describing one or more machine learning models from which the analyzed machine learning model is derived. Similarity information can also be provided such as a score or percentage of identical or similar artefacts and the like (which is indicative of derivation and/or the provenance of the analyzed machine learning model.

The consuming application or process, at 160, can, in some variations, take some sort of remedial action in response to the analyzed machine learning model being deemed to be similar (e.g., over a certain similarity threshold as determined by one of the similarity algorithms, etc.). Remedial action can include increased logging (i.e., more granular) logging of the inputs and outputs of the analyzed machine learning model, taking the analyzed machine learning model offline, isolating the analyzed machine learning model, and/or modifying or otherwise diverting the output of the analyzed machine learning model. Remedial action can also be providing information regarding intellectual property theft and the like (e.g., in a graphical user interface, etc.).

Figure 2:
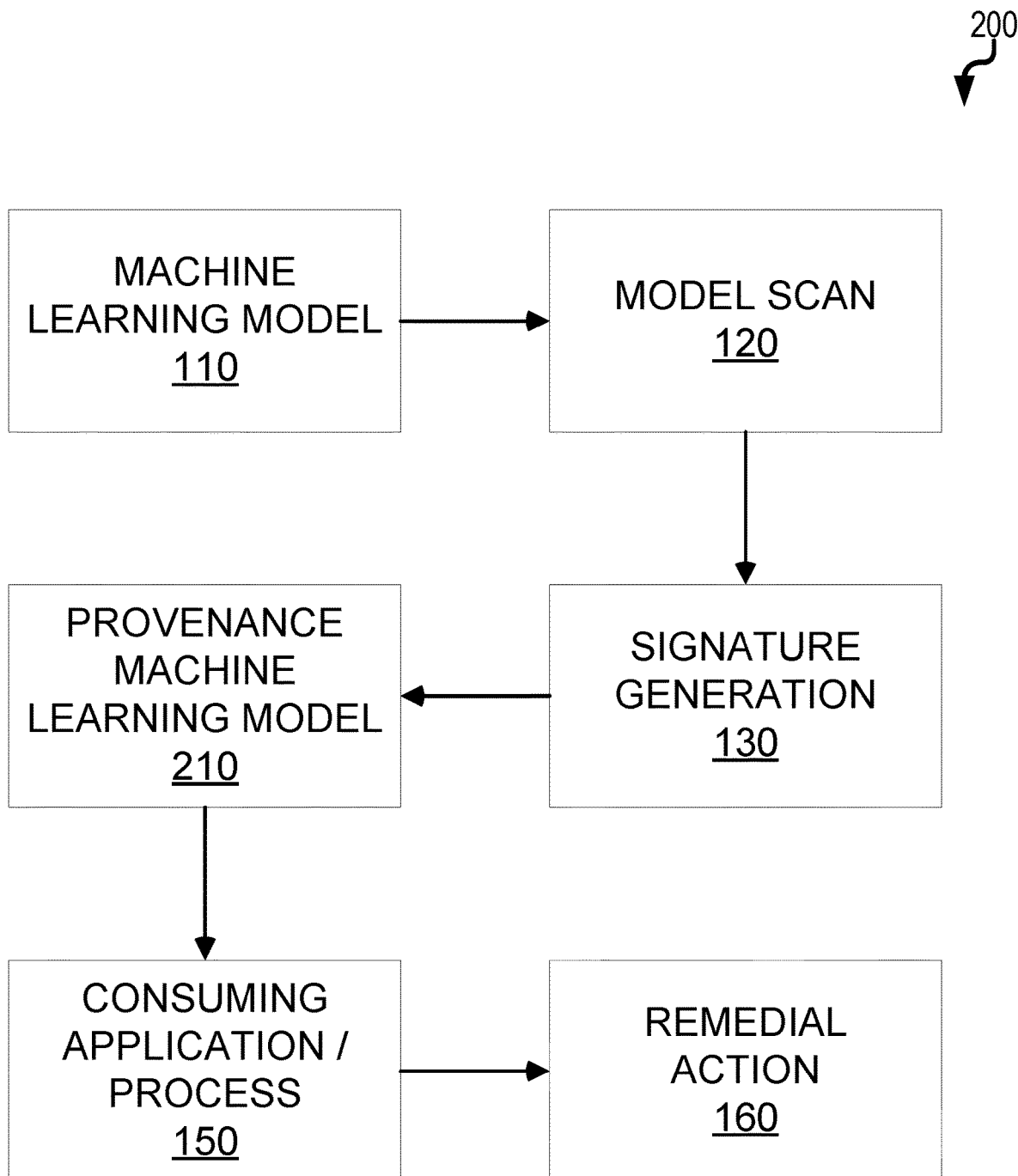
FIG. 2 is a process diagram illustrating machine learning model fingerprinting and provenance determination based on a similarity analysis.

In some variations, in lieu or in addition to the similarity analyses provided above, the provenance of a machine learning model can be determined using machine learning techniques. For example, with reference to diagram 200 of FIG. 2, a provenance machine learning model 210 can be trained using fingerprints from each of a plurality of reference machine learning models so that the output of the provenance machine learning model can identify which of the reference machine learning models is closest to the analyzed machine learning model. Other aspects of the workflow illustrated in FIG. 2 are similar or the same as described above in connection with FIG. 1. Given a sufficient number of fingerprints, a machine learning model can be trained on the fingerprint corpus itself. This training then results in a machine learning model that can identify provenance for another model. For example, using a few known to be related models an "IS" set of fingerprints can be generated for all of their artefacts (i.e., "is related"). This process can also be repeated for a set of known-to-not-be-related models as well with the result set forming an "IS NOT" set. This data can then be used to train the provenance machine learning model 210 to identify whether a set of input artefacts belongs to the IS or IS NOT set. The provenance machine learning model 210 will have then learned subtle statistical relationships between the various fingerprinting techniques in ways more sophisticated than mere similarity of one to another of the same variety The output of the provenance machine learning model 210 can, for example, provide a similarity score relative to each of a plurality of reference machine learning models which indicate a likelihood of the analyzed machine learning model being derived from such reference model. Alternatively, the provenance machine learning model 210 can identify a single reference machine learning model with a highest score (and optionally also provide the corresponding score and/or a confidence level). The output of this identification can be provided to a consuming application or process in the manner described above.

Figure 3:
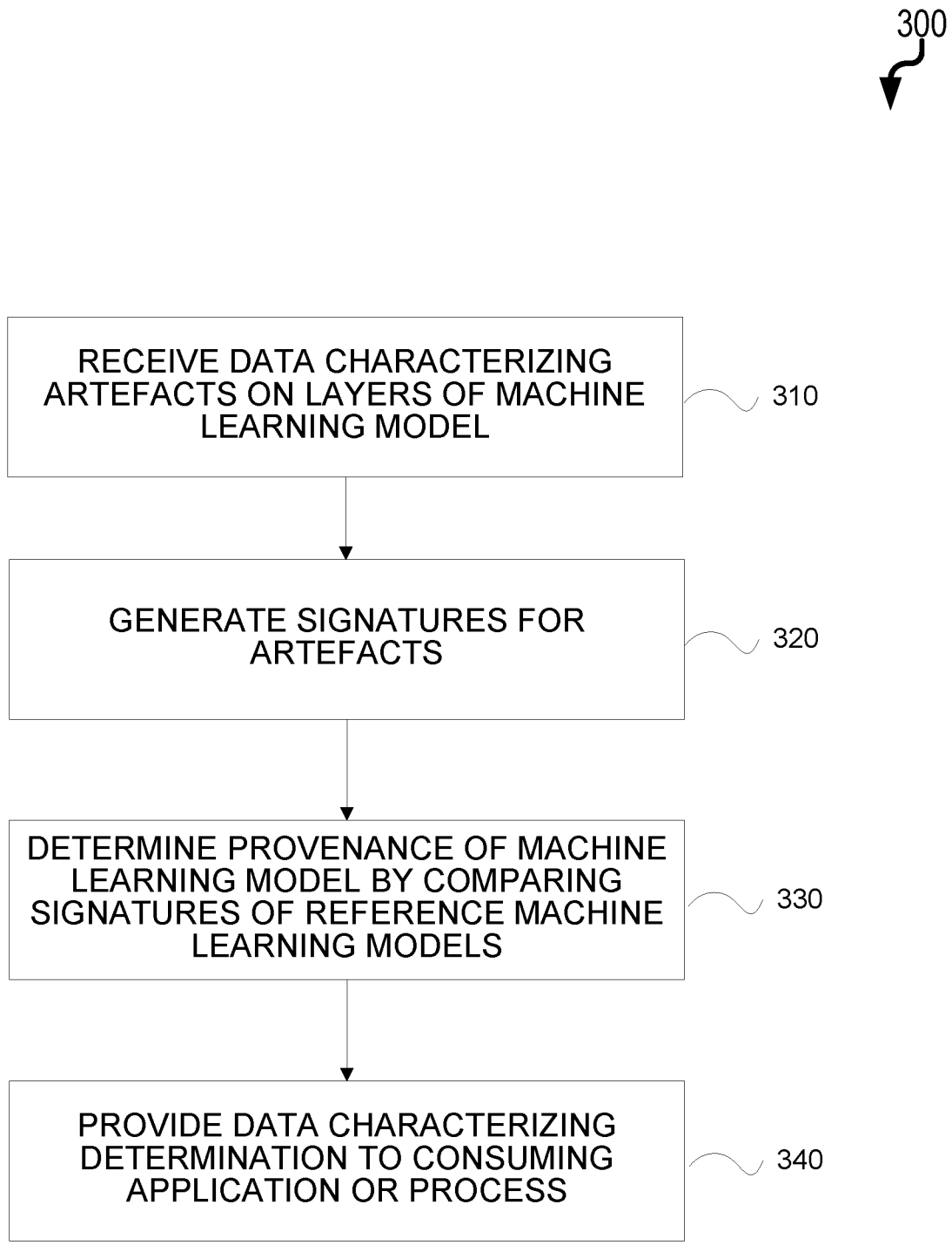
FIG. 3 is a diagram illustrating a first machine learning model fingerprint generation and comparison workflow.

FIG. 3 is a process flow diagram of a method for implementation by one or more computing devices in which, at 310, data is received that characterizes artefacts associated with each of a plurality of layers of a first machine learning model. Thereafter, at 320, fingerprints are generated for each artefact in each layer of the first machine learning model. The generated fingerprints can collectively form a model indicator for the first machine learning model. It is later determined, at 330, whether the first machine learning model is derived from another machine learning model by performing a similarity analysis between the model indicator for the first machine learning model and model indicators generated for each of a plurality of reference machine learning models each comprising a respective set of fingerprints. Data can be provided, at 340, to a consuming application or process which characterizes this determination. In some variations, further downstream actions including remediation actions can be undertaken by the consuming application or process.

Figure 4:
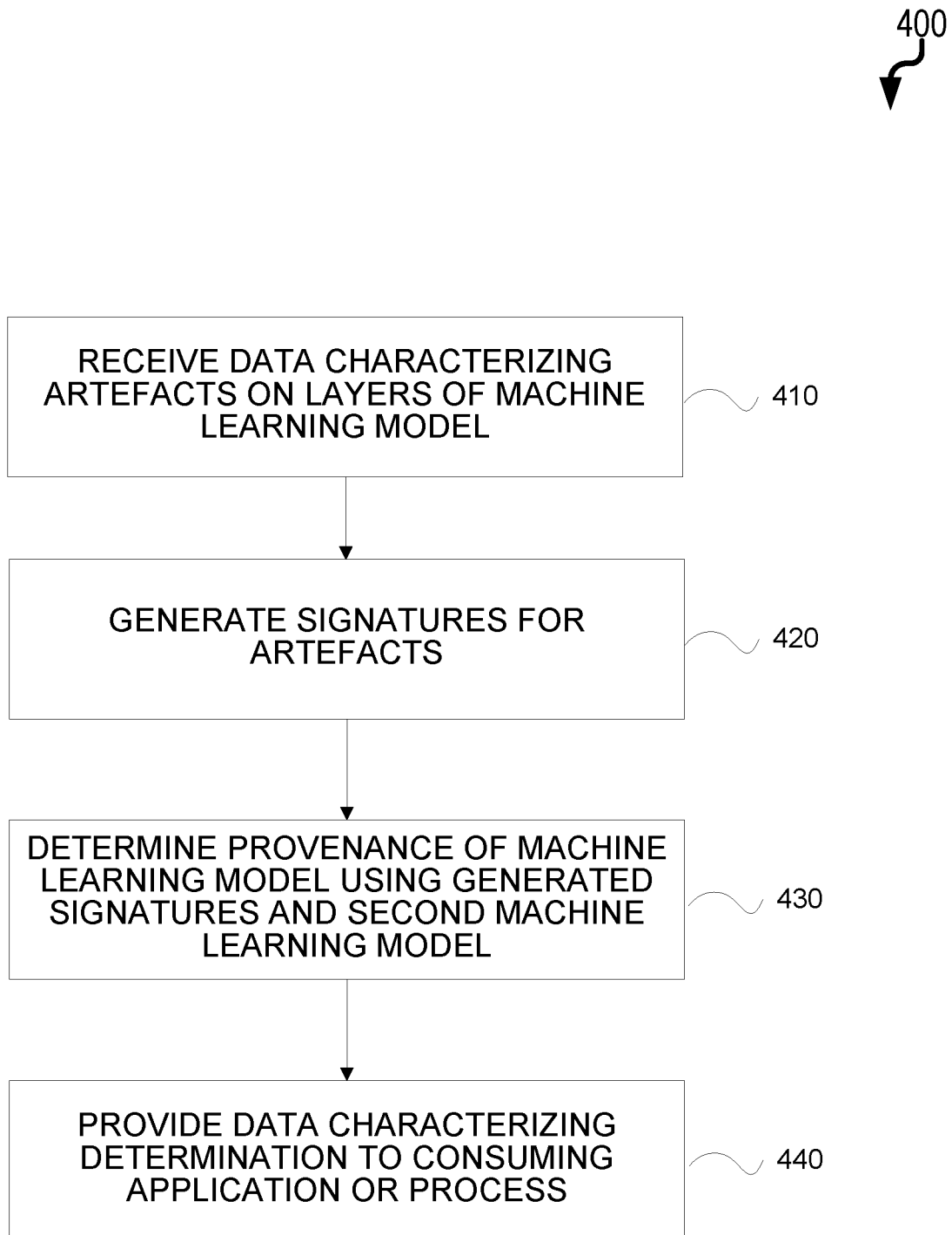
FIG. 4 is a process diagram illustrating machine learning model fingerprinting and provenance determination using machine learning.

FIG. 4 is a process flow diagram of a method for implementation by one or more computing devices in which, at 410, data is received that characterizes artefacts associated with each of a plurality of layers of a first machine learning model. Thereafter, at 420, for each layer, fingerprints are generated corresponding to each of the artefacts in such layer. The generated fingerprints collectively form a model indicator for the first machine learning model. The generated fingerprints are used, at 430, by a second machine learning model to determine whether the first machine learning model is derived from another machine learning model (e.g., a reference or known model). Data characterizing such determination is provided, at 440, to a consuming application or process.

Figure 5:
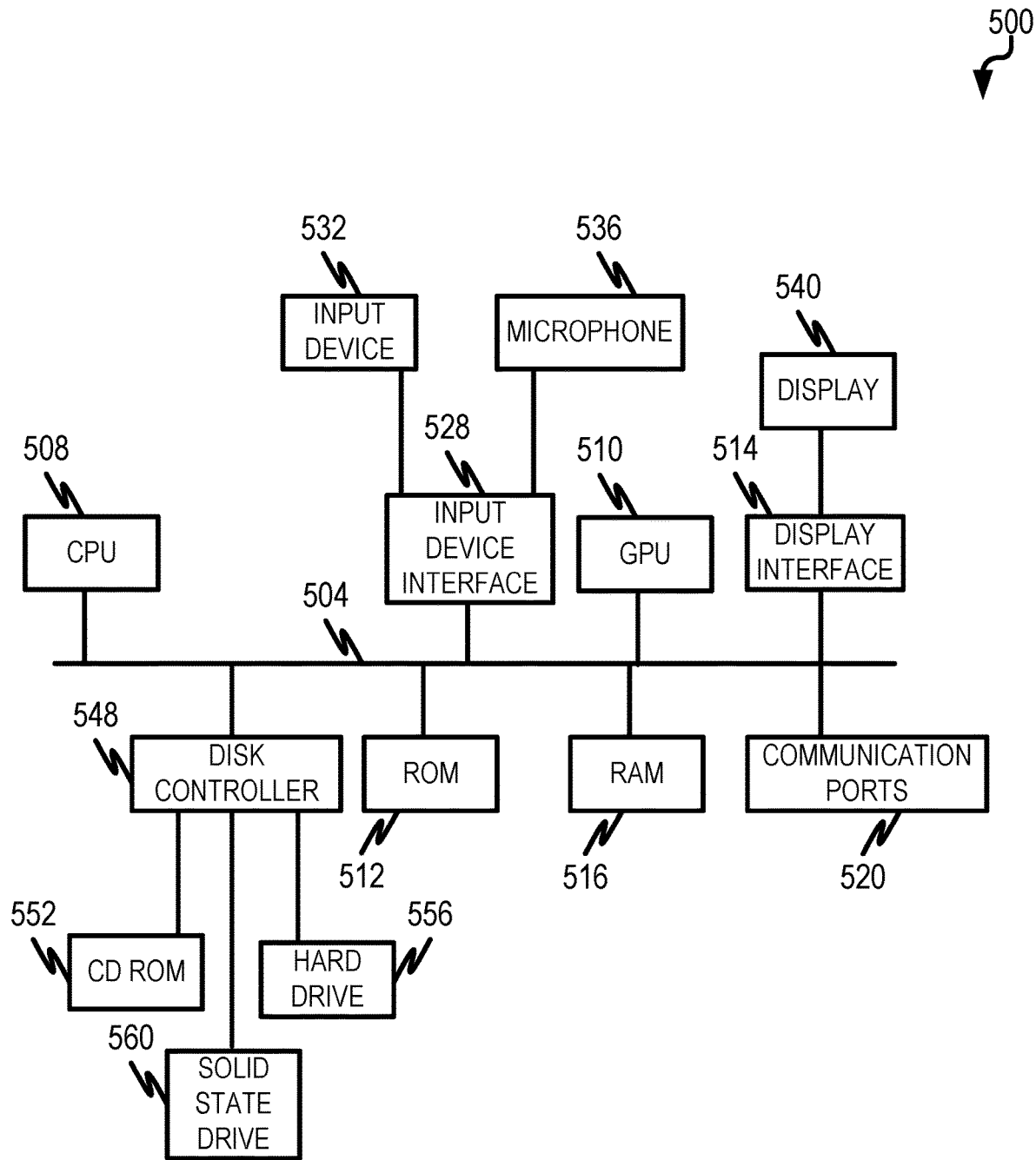
FIG. 5 is a diagram illustrating aspects of a computing device which can be used to implement the current subject matter.

FIG. 5 is a diagram 500 illustrating a sample computing device architecture for implementing various aspects described herein. A bus 504 can serve as the information highway interconnecting the other illustrated components of the hardware. A processing system 508 labeled CPU (central processing unit) (e.g., one or more computer processors/data processors at a given computer or at multiple computers), can perform calculations and logic operations required to execute a program. In addition, a processing system 510 labeled GPU (graphics processing unit) (e.g., one or more computer processors/data processors at a given computer or at multiple computers), can perform calculations and logic operations required to execute a program. A non-transitory processor-readable storage medium, such as read only memory (ROM) 512 and random access memory (RAM) 516, can be in communication with the processing system 508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 548 can interface with one or more optional disk drives to the system bus 504. These disk drives can be external or internal floppy disk drives such as 560, external or internal drive including solid state drives such as 552, or external or internal hard drives 556. As indicated previously, these various disk drives 552, 556, 560 and disk controllers are optional devices. The system bus 504 can also include at least one communication port 520 to allow for communication with external devices either physically connected to the computing system or available externally through a wired or wireless network. In some cases, the at least one communication port 520 includes or otherwise comprises a network interface.

To provide for interaction with a user, the subject matter described herein can be implemented on a computing device having a display device 540 (e.g., an LED, LCD, etc. monitor) for displaying information obtained from the bus 504 via a display interface 514 to the user and an input device 532 such as keyboard and/or a pointing device (e.g., a mouse or a trackball) and/or a touchscreen by which the user can provide input to the computer. Other kinds of input devices 532 can be used to provide for interaction with a user as well; for example, feedback provided to the user can be any form of sensory feedback (e.g., visual feedback, auditory feedback by way of a microphone 536, or tactile feedback); and input from the user can be received in any form, including acoustic, speech, or tactile input. The input device 532 and the microphone 536 can be coupled to and convey information via the bus 504 by way of an input device interface 528. Other computing devices, such as dedicated servers, can omit one or more of the display 540 and display interface 514, the input device 532, the microphone 536, and input device interface 528.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   receiving data characterizing artefacts associated with each of a plurality of layers of a first machine learning model;
   generating, for each layer of the first machine learning model, fingerprints corresponding to each of the artefacts in such layer, the generated fingerprints collectively forming a model indicator for the first machine learning model;

determining, using a second machine learning model and based on the generated fingerprints, whether the first machine learning model is derived from another machine learning model; and providing data characterizing the determining to a consuming application or process;

wherein:
- a first portion of the fingerprints are generated by a combination of determining a means distance of a manifold representing an artefact from a point in space and measuring fluctuations of the manifold relative to a mean distance; and
- a second portion of the fingerprints are generated by measuring frequency of values in an artefact relative to expected quantized values.

2. The method of claim 1, wherein the artefacts comprise: weights, biases, running mean, and running variance.

3. The method of claim 1, wherein the determining is conducted on an fingerprint-by-fingerprint basis.

4. The method of claim 1, wherein the determining is conducted on a model indicator-by-model indicator basis.

5. The method of claim 4 further comprising: generating, by the second machine learning model, a score characterizing the level of similarity, wherein the score forms part of the provided data.

6. The method of claim 1, wherein at least one of the artefacts only has a single corresponding generated fingerprint.

7. The method of claim 1, wherein at least one of the artefacts has a plurality of corresponding generated fingerprints.

8. The method of claim 1 further comprising:
initiating, by the consuming application or process, a remediation operation relative to the first machine learning model.

9. The method of claim 8, wherein the remediation operation comprises: isolating or blocking access to the first machine learning model.

10. The method of claim 8, wherein the remediation operation comprises: partially disabling functionality of the first machine learning model.

11. The method of claim 8, wherein the remediation operation comprises: logging inputs and/or outputs of the first machine learning model.

12. The method of claim 8, wherein the remediation operation comprises: poisoning the first machine learning model.

13. The method of claim 1 further comprising:
training the provenance machine learning model with historical fingerprints having a known provenance classification.

14. The method of claim 1, wherein the determining comprises one or more of: storing the data characterizing the determining in physical persistence, loading the data characterizing the determining into memory, transmitting the data characterizing the determining over a network to a remote computing device, or causing the data characterizing the determining to be displayed in a graphical user interface.

15. A method comprising:
receiving data comprising a model indicator of a first machine learning model, the model indicator comprising a plurality of fingerprints corresponding to each of a plurality of artefacts forming part of the first machine learning model;

determining, using a second machine learning model and based on the signatures in the received model indicator, whether the first machine learning model is derived from another machine learning model; and providing data characterizing the determining to a consuming application or process;

wherein:
- a first portion of the fingerprints are generated by a combination of determining a means distance of a manifold representing an artefact from a point in space and measuring fluctuations of the manifold relative to a mean distance; and
- a second portion of the fingerprints are generated by measuring frequency of values in an artefact relative to expected quantized values.

16. A method comprising:
receiving data characterizing artefacts associated with a machine learning model;

generating fingerprints corresponding to each of the artefacts associated with the machine learning model; and providing the generated fingerprints to a consuming application or process;

wherein:
- a first portion of the fingerprints are generated by a combination of determining a means distance of a manifold representing an artefact from a point in space and measuring fluctuations of the manifold relative to a mean distance;
- a second portion of the fingerprints are generated by measuring frequency of values in an artefact relative to expected quantized values; and
- the generated fingerprints determine whether the machine learning model is derived from another machine learning model.

17. The method of claim 16, wherein a third portion of the fingerprints are generated by determining a means distance of a manifold representing an artefact from a point in space.

18. The method of claim 16, wherein a third portion of the fingerprints are generated by measuring fluctuations of a manifold representing an artefact relative to a mean distance.

19. The method of claim 16 further comprising:
determining, based on the generated fingerprints, whether the machine learning model is derived from another machine learning model.

20. The method of claim 19, wherein the artefacts comprise: weights, biases, running mean, and running variance.

* * * * *